US006284406B1

(12) United States Patent
Xing et al.

(10) Patent No.: US 6,284,406 B1
(45) Date of Patent: Sep. 4, 2001

(54) IC CARD WITH THIN BATTERY

(75) Inventors: Xuekun Xing, Richmond Heights; Frough K. Shokoohi, Kirtland; Mark L. Daroux, Cleveland Heights; Joan Corniuk; Wanjun Fang, both of Mentor, all of OH (US); George W. Moutsios, Norcross, GA (US)

(73) Assignee: NTK Powerdex, Inc., Eastlake, OH (US)

( * ) Notice: Subject to any disclaimer, the term of this patent is extended or adjusted under 35 U.S.C. 154(b) by 0 days.

(21) Appl. No.: 09/591,290

(22) Filed: Jun. 9, 2000

(51) Int. Cl.[7] .................................................. H01M 2/10
(52) U.S. Cl. .......................... 429/96; 429/100; 429/121; 429/163; 365/228
(58) Field of Search .................... 429/96, 97, 98, 429/99, 100, 121, 7, 163, 231.95, 231.8; 365/229, 228; 235/491, 492

(56) References Cited

U.S. PATENT DOCUMENTS

| | | |
|---|---|---|
| 4,353,064 | 10/1982 | Stamm ................................ 340/825 |
| 4,908,502 | 3/1990 | Jackson ............................... 235/437 |
| 5,192,947 | 3/1993 | Neustein ......................... 340/825.44 |
| 5,212,664 | 5/1993 | Shinohara ........................... 365/229 |
| 5,296,318 | 3/1994 | Gozdz et al. ....................... 429/192 |
| 5,539,819 | 7/1996 | Sonoyama et al. ................. 379/355 |
| 5,568,441 | 10/1996 | Sanemitsu ........................... 365/229 |
| 5,574,270 | 11/1996 | Steffen ............................... 235/441 |
| 5,585,617 | 12/1996 | Ohbuchi et al. .................... 235/491 |
| 5,787,174 | * 7/1998 | Tuttle ................................... 380/23 |
| 5,989,751 | * 11/1999 | Cotte et al. ......................... 429/331 |
| 6,024,285 | * 2/2000 | Mish ................................... 235/492 |

* cited by examiner

Primary Examiner—Gabrielle Brouillette
Assistant Examiner—R. Alejandro
(74) Attorney, Agent, or Firm—Mark Kusner

(57) ABSTRACT

An IC card comprising an electronic device and a battery within a plastic card for electrically energizing the electronic device. The battery is comprised of a monolithic electrochemical cell having a lithium-containing cathode, a carbon anode, and a porous polymer separator infused with electrolyte solution. The cell has a thickness of less than 0.7 mm. A package containing the cell formed of a sheet of flexible laminate material having at least one metal foil layer and a layer of an adhesive-like polymeric material. The battery has an overall thickness of less than 0.8 mm.

5 Claims, 5 Drawing Sheets

US 6,284,406 B1

IC CARD WITH THIN BATTERY

FIELD OF THE INVENTION

The present invention relates generally to IC (integrated circuit) information cards, and more particularly, to an IC card having a power source as part thereof.

BACKGROUND OF THE INVENTION

The term "intelligent" or "smart" cards generally refers to information cards that contain integrated circuits (IC) for storing, retrieving, processing and transmitting information. These smart cards or IC cards find advantageous application in the fields of finance, commerce, transportation, communication, health and safety, and identification and security.

It is known to incorporate batteries into such cards to provide a power source for the electronic circuitry within. Having a battery incorporated into the IC card allows for the storage of greater amounts of data, and further allows for improved processing capabilities. As will be appreciated, the available space within an IC card is limited and requires an extremely thin power source. While it is known to incorporate batteries with IC cards, it has been difficult to actually reduce to practice an IC card having the thickness of an typical credit card, and at the same time, provide the energy requirements necessary for storing and retrieving large amounts of data. With the addition of more and more features of electronic devices to IC cards, the allottable space for a power source within the card becomes smaller and smaller. It is believed that with today's technology and with the desire to provide more and more features therein, the allowable area, or footprint, for a battery within an IC card (of conventional credit card dimensions) will tend to become less than about 25 mm by 35 mm. In addition, the thickness of the battery must be less than 1 mm to fit within conventional credit cards, which themselves are typically about 0.8 mm thick. With such constraints, it becomes more and more difficult to utilize batteries in conventional cylindrical or button cans and still provide the necessary energy and power. In addition, as more and more electronic capabilities are added to IC cards, the energy requirements will increase. Higher and higher electrical drain rates will thus tend to require larger and more powerful batteries, rather than smaller ones.

Because of the difficulty of providing the energy required within the space constraints of the credit card size, it is desirable to use the most energetic battery chemistries practicable. This is particularly important for secondary (rechargeable) batteries, because commercially-used secondary chemistries have, in general, lower energy content than commercially-used primary (non-rechargeable) chemistries. For example, lithium-ion chemistries have some of the highest energy densities among commercially available secondary systems, but still have considerably lower energy content than the most energetic primary battery chemistries, such as those based on lithium metal. Secondary electrode materials having higher energy content than the currently used materials are known, but have not been used in practice because of concerns about their safety, particularly their thermal stability.

The present invention overcomes these and other problems, and provides an IC card having as part thereof an ultra-thin, secondary battery having a flexible battery package.

SUMMARY OF THE INVENTION

In accordance with the present invention, there is provided an IC card, comprised of an electronic device, and a battery within the card for electrically energizing the electronic device. The battery is comprised of a monolithic electrochemical cell having a lithium-containing anode, a carbon-containing cathode and a porous polymer separator infused with an electrolyte solution. The cell has a thickness of less than 0.7 mm. A package contains the cell. The package is formed of a sheet of flexible laminate material having at least one metal foil layer and a layer of an adhesive-like polymeric material. The battery has an overall thickness of less than 0.8 mm.

It is an object of the present invention to provide an IC card having a power source as part thereof.

It is another object of the present invention to provide an IC card as described above wherein the power source may be a primary or secondary battery.

Another object of the present invention is to provide an IC card as described above wherein the IC card is not significantly thicker than a conventional credit card.

A still further object of the present invention is to provide an IC card as described above wherein the power source is part of a laminate card structure.

A still further object of the present invention is to provide an IC card as described above that utilizes lithium-ion polymer battery technology.

A still further object of the present invention is to provide an IC card as described above that utilizes lithium-ion polymer battery technology in which the cathode material is primarily lithiated nickel oxide.

These and other objects and advantages will become apparent from the following description of a preferred embodiment of the invention taken together with the accompanying drawings.

BRIEF DESCRIPTION OF THE DRAWINGS

The invention may take physical form in certain parts and arrangement of parts, a preferred embodiment of which will be described in detail in the specification and illustrated in the accompanying drawings which forms a part hereof, and wherein.

DETAILED DESCRIPTION OF THE PREFERRED EMBODIMENT

Figure 1:
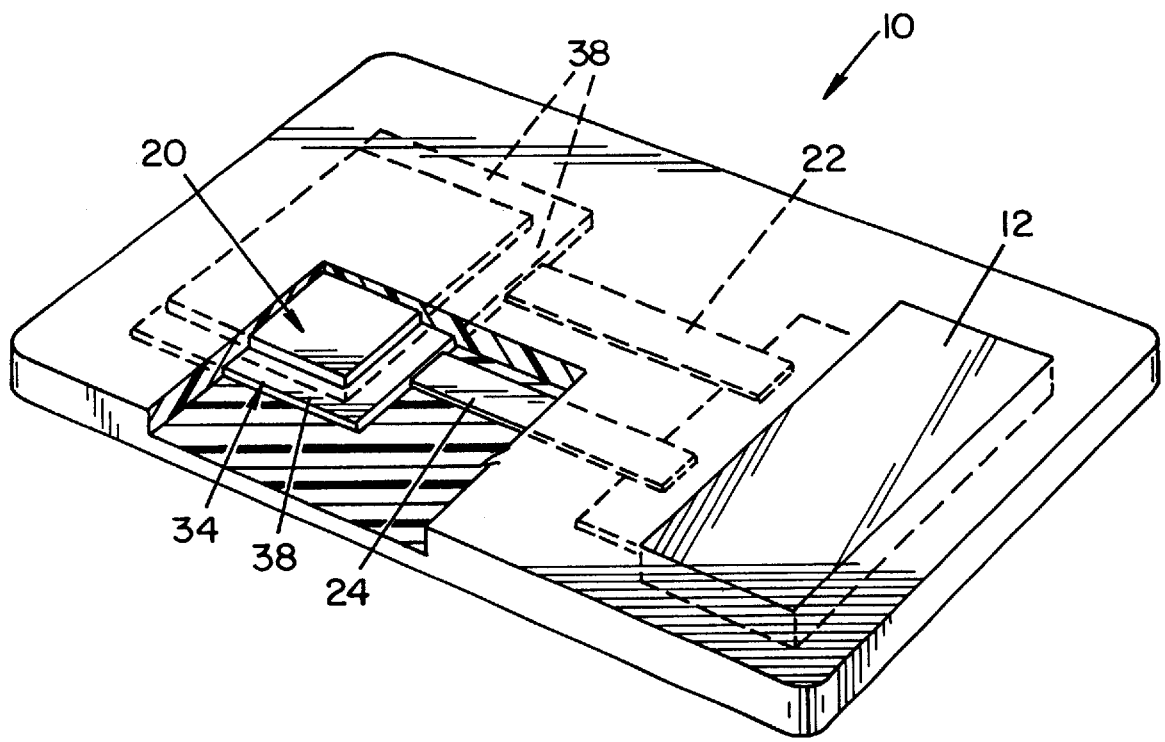
FIG. 1 is a partially sectioned, enlarged perspective view of an IC card illustrating a preferred embodiment of the present invention.
Figure 2:
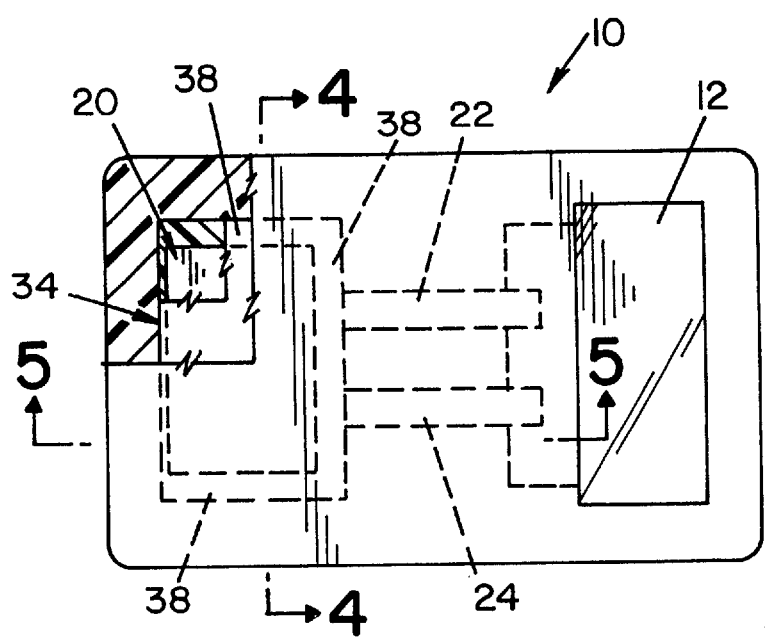
FIG. 2 is partially sectioned, top plan view of the IC card shown in FIG. 1.

Referring now to the drawings wherein the showings are for the purpose of illustrating preferred embodiments of the invention only, and not for the purpose of limiting same, FIG. 1 shows an IC card 10 illustrating a preferred embodiment of the present invention. In the embodiment shown, IC card 10 includes a battery 20 having leads 22, 24 extending therefrom. Leads 22, 24 are shown connected to an electronic device 12. Device 12 in and of itself forms no part of the present invention; and is disclosed merely to represent schematically various electronic devices that may be found in an IC card. Such devices may include, by way of example but not limitation, a microprocessor, memory chips, liquid crystal displays, keyboards and switches, transmitters or other electronic circuitry. These devices and others may be incorporated within IC card 10 to be powered by battery 20 without deviating from the present invention. The present invention is primarily directed to an IC card and a thin battery 20 for use therein. Thus, while specific electronic devices are not shown, it will be appreciated that any electronic device requiring electrical energy may be used within IC card 10 without deviating from the present invention.

Figure 3A:
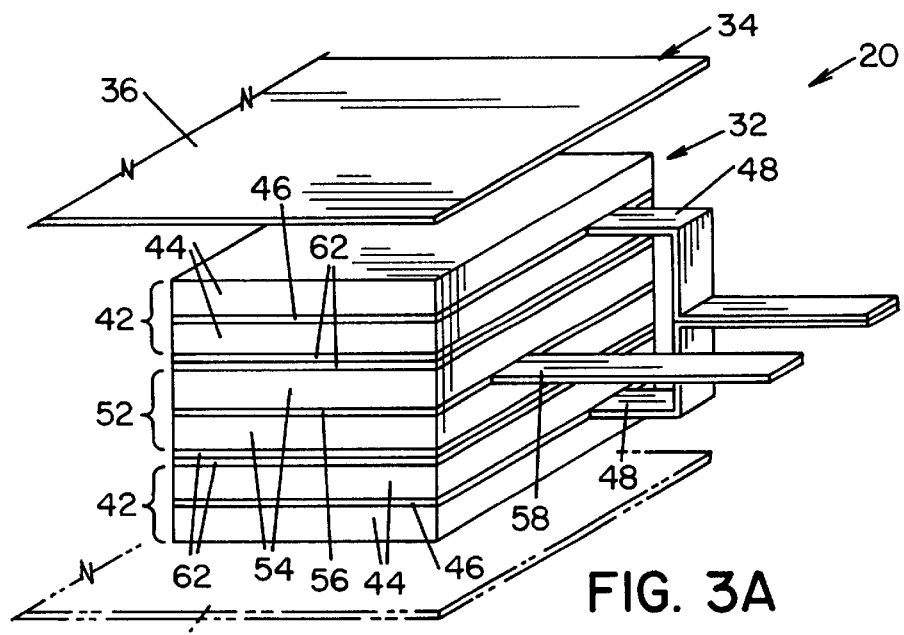
FIG. 3A is an enlarged sectional view of a preferred battery cell for use in the IC card shown in FIG. 1.
Figure 3B:
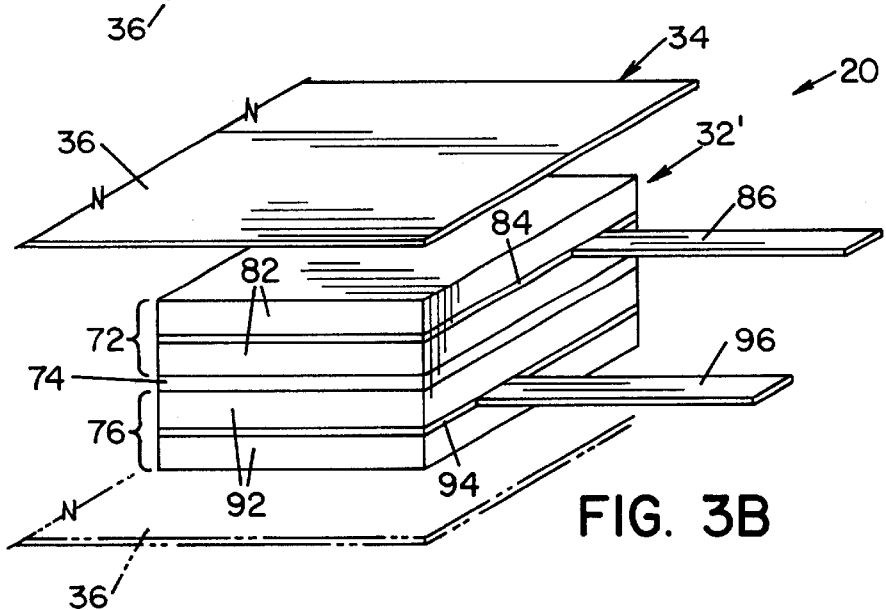
FIG. 3B is an enlarged sectional view of an alternate battery cell for use in the IC card shown in FIG. 1.
Figure 3C:
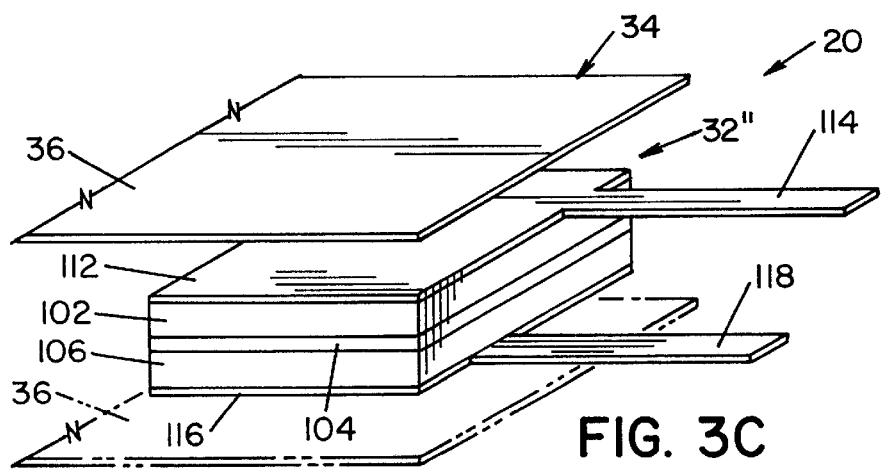
FIG. 3C is an enlarged sectional view of an alternate battery cell for use in the IC card shown in FIG. 1.

Referring now to FIGS. 3A–3C, several embodiments of battery 20 are shown. In accordance with the present invention, battery 20 is a solid, electrolytic cell 32 contained within a package 34 formed of a flexible laminate material 36. Cell 32 is preferably a lithium-based electrochemical cell. Cell 32 may be a primary (non-rechargeable) cell or a secondary (rechargeable) cell, but is preferably a secondary cell so to allow for greater overall energy consumption over the lifetime of the battery than would be possible with a primary battery. In this respect, the ability to recharge cell 32 allows for higher drain rates over the useful life of card 10 than would be possible with a primary cell; that is, the provision of greater overall energy over the lifetime of the card permits higher average power consumption. Alternatively, or in addition, a secondary battery allows for greater or more frequent usage and a longer overall battery life.

FIG. 3A illustrates a preferred embodiment of cell 32. In FIG. 3A, cell 32 is comprised of two cathode sections 42 and an anode section 52. Each cathode section 42 is comprised of two layers 44 of a cathode film. The film forming cathode layer 44 is preferably comprised of a high-purity manganese dioxide ($MnO_2$) material. A current collector 46 formed of a metal foil or screen or mesh or equivalent is provided between each cathode layer 44. Each current collector 46 includes an outward extending tab or strip 48 that are joined together to define the positive lead of battery 20. Anode section 52 is comprised of two layers 54 of an anode film having a current collector 56 disposed therebetween. The film forming anode layers 54 is preferably comprised of a lithium-containing material. Current collector 56 includes an outwardly extending tab or strip 58 that defines the negative lead of battery 20. Between anode sections 52 and each cathode section 42, two layers of separator film 62 are disposed. Separator film layers 62 are preferably formed of a highly conductive electrolyte in a polymer matrix.

In the embodiment shown in FIG. 3A, each cathode layer 44 has a thickness of about 50 $\mu$m to 300 $\mu$m, preferably 100 $\mu$m–200 $\mu$m. Each separator layer 62 has a thickness of about 10 $\mu$m to 75 $\mu$m, preferably 15–35 $\mu$m. Each anode layer 54 has a thickness of about 50 $\mu$m to 300 $\mu$m, preferably 100–200 $\mu$m. Current conductors 46, 56 are preferably formed of metal foil and have a thickness of about 5 $\mu$m to about 35 $\mu$m. The overall thickness of cell 32 is 800 $\mu$m or less and preferably 500 m or less.

Referring now to FIG. 3B, an alternate embodiment of cell 32' is shown. In FIG. 3B, cell 32' is comprised of a cathode section 72, a separator layer 74 and an anode section 76. Cathode section 72 is comprised of two cathode film layers 82 and a current collector 84 embedded therebetween. Current collector 84 includes an outwardly extending tab 86 that defines the positive lead of cell 32'. Anode section 76 is comprised of two anode film layers 92 having a current collector 94 disposed therebetween. Current collector 94 includes an outwardly extending tab 96 that defines the negative lead of battery 20. FIG. 3C illustrates another cell designated 32". Cell 32" is similar to cell 32' in that it includes a cathode layer 102, a separator layer 104 and an anode layer 106. In cell 32", however, a current collector 112 having an outwardly extending tab 114 is provided on the outer surface of cathode 102 to define the positive lead of battery 20.

A current collector 116 having an outwardly extending tab 118 is disposed on the outer surface of anode 106 to define the negative lead of battery 20.

Referring now to outer package 34, in accordance with one aspect of the present invention, package 34 that encases cell 32 or cell 32' or 32" is formed from a sheet of flexible laminate material 36. Broadly stated, the flexible laminate material is preferably multi-layered and includes at least one layer of a metal foil and at least one layer of a thermoplastic, adhesive and sealant material. The metal foil layer is provided as a barrier to form a hermetic seal around cell 32. The thermoplastic adhesive and sealant material is provided as an adhesive layer, which when heated and cooled, may bond onto itself or onto the metallic layer such that a hermetic seal is formed around cell 32. The thickness of the laminate is preferably kept as thin as possible to minimize the overall dimensions of battery 20.

In the embodiment shown, packaging 34 is formed by placing the flat electrolytic cell 32 onto one side of a sheet of the flexible laminate. (The formation of the flexible packaging shall be described with respect to cell 32. It will be appreciated that such process for forming the flexible packaging applies equally to cell 32' and cell 32".) Cell 32 is placed in contact with the adhesive and sealant layer of the laminate and positioned such that a portion of the tabs of the current collectors forming leads 22, 24 that extend from cell 32 are positioned on the laminate, and a portion thereof extend beyond the edge of the laminate. The other half of the flexible laminate sheet 36 is then folded over onto battery 20 to overlay onto the other side of the sheet. Since the polymeric adhesive and sealant layer is the inner layer of the flexible laminate, it contacts itself along the three peripheral edges where the flexible laminate extends beyond cell 32. In this respect, the laminate sheet is dimensioned such that when folded over it extends beyond three peripheral edges of cell 32. Heat and pressure are applied to the three extending peripheral edges to cause the polymeric adhesive and sealant material to soften and bond itself together to form a generally U-shaped flange 38 about the periphery of cell 32.

Figure 4:
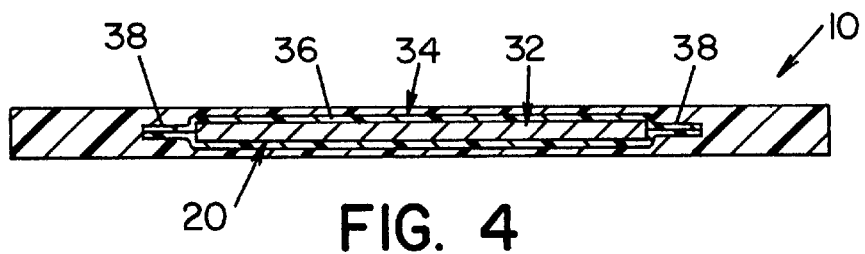
FIG. 4 is an enlarged sectional view taken along lines 4—4 of FIG. 2.
Figure 5:
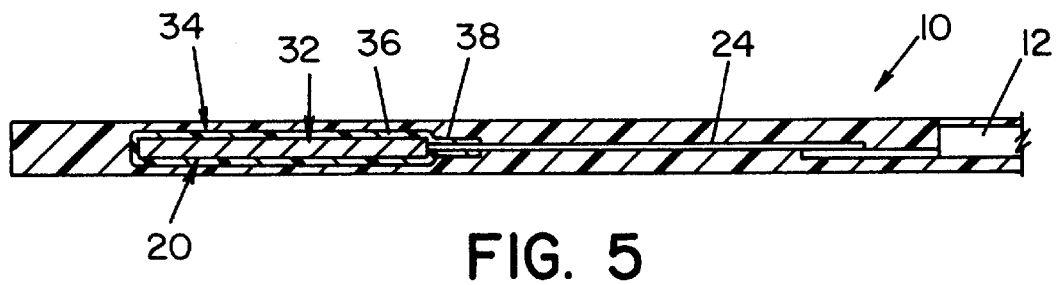
FIG. 5 is an enlarged sectional view taken along lines 5—5 of FIG. 2.

As best illustrated in FIGS. 3 and 4, flange 38 extends laterally from the sides of cell 32 in the same general plan as cell 32. The polymeric, adhesive and sealant material of the laminate thus forms a seal about the periphery of the battery, thereby providing, together with the metal foil, a package for containing and hermetically sealing cell 32. According to the present invention, the size of the battery is preferably less than 35 mm by 25 mm by 0.8 mm.

It is an essential feature of this invention that the battery be monolithic, that is, that all the components hold together, maintaining all the electrochemically active components in good ionic and/or electronic contact wherever appropriate throughout the battery, and also maintaining mechanical cohesion, without the need for any external stack pressure, such as is maintained in conventional cylindrical batteries, for example, by a metallic can.

Figure 6:
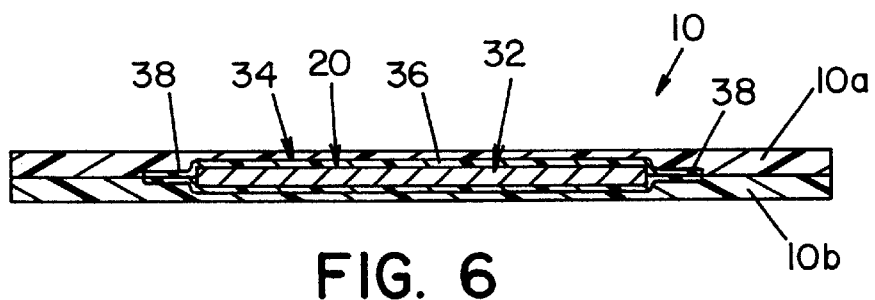
FIG. 6 is a sectioned, elevational view of an IC card illustrating an alternate embodiment of the present invention.
Figure 7:
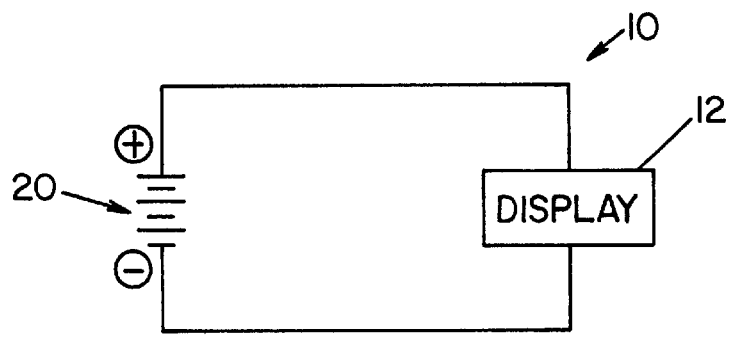
FIG. 7 is a schematic representation of the IC card shown in FIGS. 1–5.

Referring now to the assembly of card 10, leads 22, 24 are attached to electronic device 12 by conventional means, and then a polymeric material is molded around battery 20 and device 12 to form card 10. In the embodiment shown in FIGS. 1–5, battery 20 is totally encapsulated in a unitary card. FIG. 6 illustrates how card 10 may be formed from half sections, designated 10a and 10b in the drawing.

By utilizing a flat thin battery 20, and by minimizing the flexible laminate packaging by utilizing only an adhesive and sealant material and a metallic foil, a battery 20 having an overall thickness of less than 0.8 mm and preferably less than 0.5 mm is attainable. Because battery 20 is encapsulated within the plastic shell of card 10, flexible laminate 36 forming package 34 requires only a polymer sealant layer and metallic foil layer to seal cell 32, thereby reducing the overall thickness of battery 20.

Figure 8:
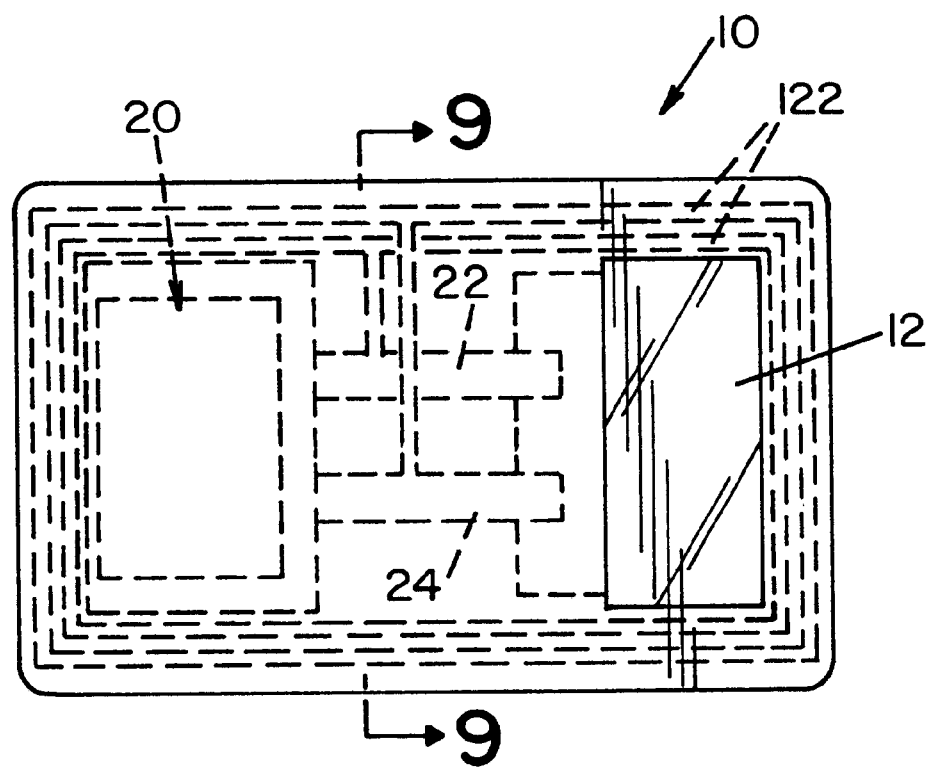
FIG. 8 is a top, plan view showing a rechargeable battery illustrating another embodiment of the present invention.
Figure 9:
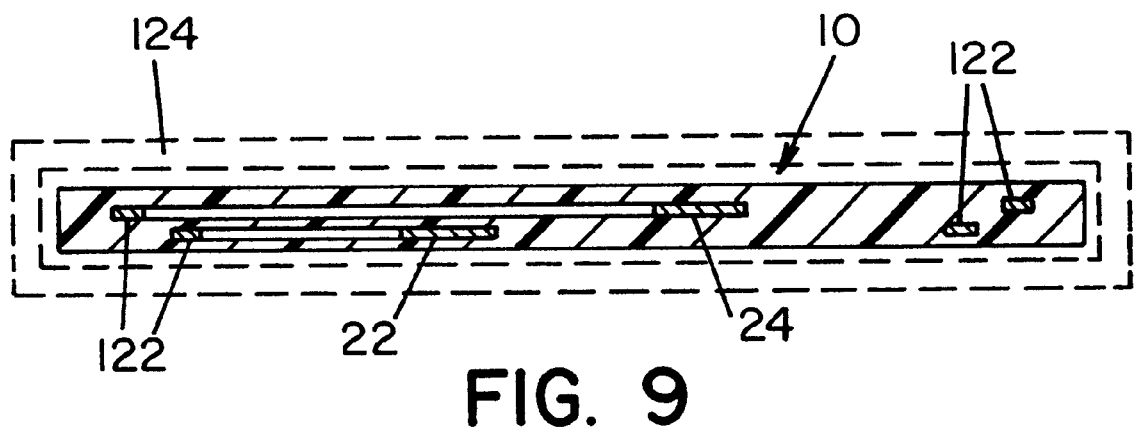
FIG. 9 is a sectional view taken along lines 9—9 of FIG. 8.

Referring now to FIGS. 8 and 9, one method of recharging battery 20 is shown. As best seen in FIG. 8, an antenna filament 122 is wound into coil about the periphery of card 10. Using filament 122, an induction device 124 schematically illustrated in FIG. 9 can induce a current into filament 122 to charge battery 20. By providing a secondary battery within card 10, long-term usage is provided with the ability of battery 20 to be recharged, thereby providing a continuous source of electrical energy to device 12.

Figure 10:
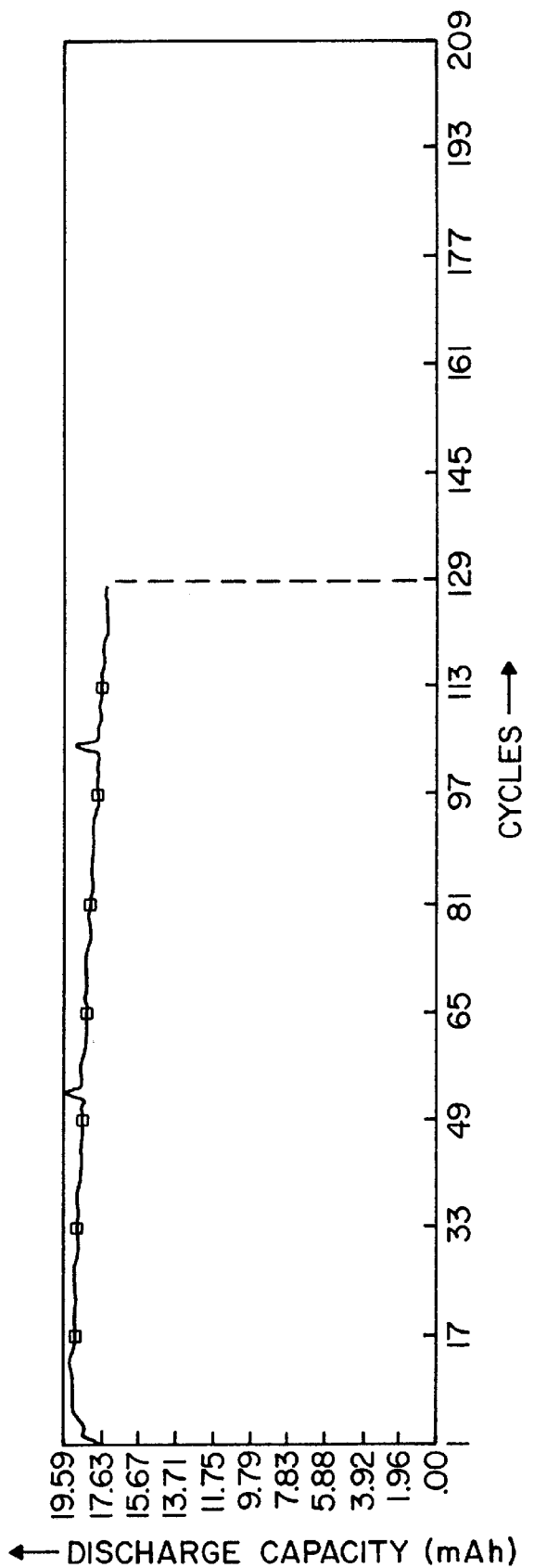
FIG. 10 is a graph illustrating the capacity of a battery card according to the present invention by recharging cycle.

FIG. 10 is a graph illustrating the high capacity retention of a battery 20 formed in accordance with the present invention. Such a battery is formed according to the construction illustrated in FIG. 3A. The anode layer comprises artificial graphite mesophase microbeads (MCMB25-28), and has dimensions of 18×24 $mm^2$, and the cathode layers comprise $LiCoO_2$ and have dimensions of 17×23 $mm^2$ and together weigh 0.263 g. The component layers are combined into a monolithic structure by a sequence of lamination procedures utilizing elevated temperatures and pressures, the pore forming components are solvent extracted, connecting tabs are attached, the battery is encapsulated in a plastic/metal foil laminate, electrolyte is added, the battery is electrochemically formed, residual gases are removed and the final hermetic package is formed. The laminated battery thickness is about 0.47 mm, and the final packaged battery is about 0.67 mm thick. The final battery has footprint dimensions of about 22×29 $mm^2$, neglecting connecting tabs. This battery, when cycled at about a C/2 rate, show an initial discharge capacity of about 19 mAh; and after 129 cycles, retains a capacity of about 17 mm, as illustrated in FIG. 10.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. An IC card, comprising:
   an electronic device; and
   a battery within said card for electrically energizing said electronic device, said battery comprised of:
   a monolithic electrochemical cell or cells having a lithium-containing cathode, a carbon anode, and a porous polymer separator infused with an electrolyte solution, said cell having a thickness of less than 0.7 mm; and
   a package containing said cell, said package formed of a sheet of flexible laminate material having at least one metal foil layer and a layer of an adhesive polymeric material, said battery having an overall thickness of less than 0.8 mm.

2. An IC card as defined in claim 1, wherein said battery is a primary battery.

3. An IC card as defined in claim 1, wherein said battery is a secondary battery.

4. An IC card as defined in claim 3, further comprising recharging means within said card for recharging said battery.

5. An IC card as defined in claim 4, wherein said recharging means includes an antenna filament imbedded within said card for inductive charging of said battery by a remote device.

* * * * *